(12) United States Patent
Luckenbaugh et al.

(10) Patent No.: US 7,757,374 B2
(45) Date of Patent: Jul. 20, 2010

(54) KEYLESS CHUCK WITH AUTOMATIC AND MANUAL LOCKING

(75) Inventors: Thomas L. Luckenbaugh, Spring Grove, PA (US); Timothy J. Bowman, Nottingham, MD (US)

(73) Assignee: Black & Decker Inc., Newark, DE (US)

(*) Notice: Subject to any disclaimer, the term of this patent is extended or adjusted under 35 U.S.C. 154(b) by 77 days.

(21) Appl. No.: 12/054,180

(22) Filed: Mar. 24, 2008

(65) Prior Publication Data

US 2008/0164662 A1 Jul. 10, 2008

Related U.S. Application Data

(63) Continuation of application No. 10/920,139, filed on Aug. 17, 2004, now Pat. No. 7,360,770.

(51) Int. Cl.
B23B 31/12 (2006.01)

(52) U.S. Cl. .......................... 29/559; 279/62; 279/140; 279/902

(58) Field of Classification Search .............. 279/60–62, 279/140, 902; 29/559; *B23B 31/12*
See application file for complete search history.

(56) References Cited

U.S. PATENT DOCUMENTS

| | | |
|---|---|---|
| 573,189 A | 12/1896 | Vogel |
| 1,907,553 A | 5/1933 | Lundin |
| 2,684,856 A | 4/1954 | Louckes |
| 3,970,323 A | 7/1976 | Schnizler, Jr. |
| 4,213,623 A | 7/1980 | Rohm |
| 4,272,087 A | 6/1981 | Rohm |
| 4,302,021 A | 11/1981 | Rohm |
| 4,395,170 A | 7/1983 | Clarey |
| 4,498,682 A | 2/1985 | Gore |
| 4,583,751 A | 4/1986 | Rohm |
| 4,627,628 A | 12/1986 | Rohm |
| 4,655,464 A | 4/1987 | Manschitz et al. |
| 4,682,918 A | 7/1987 | Palm |
| 4,695,065 A | 9/1987 | Komatsu et al. |
| 4,700,956 A | 10/1987 | Komatsu et al. |
| 4,703,942 A | 11/1987 | Rohm |
| 4,836,563 A | 6/1989 | Rohm |
| 4,840,387 A | 6/1989 | McCarthey |
| 4,842,288 A | 6/1989 | Ando |
| 4,951,955 A | 8/1990 | Sakamaki |

(Continued)

FOREIGN PATENT DOCUMENTS

CN 2407862 Y 11/2000

(Continued)

*Primary Examiner*—Eric A Gates
(74) *Attorney, Agent, or Firm*—Harness, Dickey & Pierce, P.L.C.

(57) ABSTRACT

A keyless chuck having both an automatic locking feature and a manual locking feature. The automatic locking feature provides for automatic locking of the chuck in a tightened state when a predetermined tightening torque has been exceeded. The chuck can be utilized with only the automatic locking feature engaged. If desired, a manual locking feature can also be engaged wherein rotation of the outer sleeve relative to the body is prevented. A retaining feature can be employed to inhibit the movement of the manual locking feature between a locked and unlocked position. The retaining feature thereby avoids accidental engaging or disengaging of the manual locking feature.

30 Claims, 10 Drawing Sheets

U.S. PATENT DOCUMENTS

| | | | |
|---|---|---|---|
| 4,955,623 | A | 9/1990 | Rohm |
| 4,958,840 | A | 9/1990 | Palm |
| 5,009,439 | A | 4/1991 | Sakamaki |
| 5,031,925 | A | 7/1991 | Tatsu et al. |
| 5,054,796 | A | 10/1991 | Rohm |
| 5,125,673 | A | 6/1992 | Huff et al. |
| 5,145,192 | A | 9/1992 | Rohm |
| 5,145,193 | A | 9/1992 | Rohm |
| 5,171,030 | A | 12/1992 | Rohm |
| 5,174,588 | A | 12/1992 | Reibetanz et al. |
| 5,183,274 | A | 2/1993 | Sakamaki |
| 5,195,760 | A | 3/1993 | Wheeler et al. |
| 5,232,230 | A | 8/1993 | Lin |
| 5,234,223 | A | 8/1993 | Sakamaki |
| 5,236,206 | A | 8/1993 | Rohm |
| 5,286,041 | A | 2/1994 | Rohm |
| 5,330,204 | A | 7/1994 | Huff et al. |
| 5,348,317 | A | 9/1994 | Steadings et al. |
| 5,375,857 | A | 12/1994 | Rohm |
| 5,375,858 | A | 12/1994 | Rohm |
| 5,431,419 | A | 7/1995 | Mack |
| 5,435,578 | A | 7/1995 | Rohm |
| 5,452,906 | A | 9/1995 | Huff et al. |
| 5,458,345 | A | 10/1995 | Amyot |
| 5,464,229 | A | 11/1995 | Salpaka |
| 5,464,230 | A | 11/1995 | Rohm |
| 5,465,983 | A | 11/1995 | Owens et al. |
| 5,476,273 | A | 12/1995 | Shadeck et al. |
| 5,499,829 | A | 3/1996 | Rohm |
| 5,499,830 | A | 3/1996 | Schnizler |
| 5,501,473 | A | 3/1996 | Barton et al. |
| 5,540,453 | A | 7/1996 | Sakamaki |
| 5,573,254 | A | 11/1996 | Huff et al. |
| 5,615,899 | A | 4/1997 | Sakamaki |
| 5,624,125 | A | 4/1997 | Rohm |
| 5,709,392 | A | 1/1998 | Barton et al. |
| 5,741,016 | A | 4/1998 | Barton et al. |
| 5,816,583 | A | 10/1998 | Middleton |
| 5,833,247 | A | 11/1998 | Deuschle et al. |
| 5,913,524 | A | 6/1999 | Barton |
| 5,924,702 | A | 7/1999 | Huff et al. |
| 5,957,469 | A | 9/1999 | Miles et al. |
| 6,022,029 | A | 2/2000 | Sakamaki |
| 6,073,939 | A | 6/2000 | Steadings et al. |
| 6,168,170 | B1 | 1/2001 | Miles et al. |
| 6,179,301 | B1 | 1/2001 | Steadings et al. |
| 6,196,554 | B1 | 3/2001 | Gaddis et al. |
| 6,217,033 | B1 | 4/2001 | Sakamaki et al. |
| 6,260,856 | B1 | 7/2001 | Temple-Wilson |
| 6,264,208 | B1 | 7/2001 | Sakamaki et al. |
| 6,302,407 | B1 | 10/2001 | Hsueh |
| 6,390,481 | B1 | 5/2002 | Nakamuro |
| 6,398,226 | B1 | 6/2002 | Huggins et al. |
| 6,402,160 | B1 | 6/2002 | Grogan et al. |
| 6,409,181 | B1 | 6/2002 | Hsueh |
| 6,435,521 | B2 | 8/2002 | Steadings et al. |
| 6,488,287 | B2 | 12/2002 | Gaddis et al. |
| 6,517,088 | B1 | 2/2003 | Rohm |
| 6,575,478 | B2 | 6/2003 | Rohm et al. |
| 6,659,474 | B2 | 12/2003 | Sakamaki et al. |
| 6,729,812 | B2 | 5/2004 | Yaksich et al. |
| 6,824,141 | B1 | 11/2004 | Sakamaki et al. |
| 6,832,764 | B2 | 12/2004 | Steadings et al. |
| 6,843,485 | B2 | 1/2005 | Sakamaki et al. |
| 7,630,770 | B2 | 4/2008 | Luckenbaugh et al. |
| 2002/0089127 | A1 | 7/2002 | Rohm |
| 2003/0006567 | A1 | 1/2003 | Steadings et al. |
| 2003/0141676 | A1 | 7/2003 | Sakamaki et al. |
| 2004/0021275 | A1 | 2/2004 | Sakamaki et al. |
| 2004/0108662 | A1 | 6/2004 | Sakamaki et al. |
| 2005/0104304 | A1 | 5/2005 | Steadings et al. |

FOREIGN PATENT DOCUMENTS

| | | |
|---|---|---|
| DE | 3617105 | 11/1987 |
| EP | 0300375 | 1/1989 |
| EP | 0468128 | 1/1992 |
| FR | 2645056 | 10/1990 |
| GB | 2034210 | 4/1980 |
| JP | 57-48407 | 3/1982 |
| JP | 1-92009 | 4/1989 |
| JP | 1-289608 | 11/1989 |
| JP | 3-270809 | 12/1991 |
| JP | 8-90316 | 4/1996 |
| JP | 2001-259907 | 9/2001 |
| WO | WO 00/35619 | 6/2000 |

KEYLESS CHUCK WITH AUTOMATIC AND MANUAL LOCKING

CROSS-REFERENCE TO RELATED APPLICATIONS

This application is a continuation of U.S. patent application Ser. No. 10/920,139 filed on Aug. 17, 2004, now issued as U.S. Pat. No. 7,360,770. The disclosure of the above application is incorporated herein by reference.

FIELD OF THE INVENTION

The present invention relates to keyless chucks and, more particularly, to keyless chucks with an automatic axial lock.

BACKGROUND OF THE INVENTION

Keyless chucks operable to retain a work piece therein by rotational movement of an outer sleeve relative to the body of the chuck are known. Many of these keyless chucks incorporate a locking feature to prevent the sleeve from opening the chuck during use. One type of locking feature is an automatic locking feature wherein, as the jaws are tightened about the work piece, the sleeve, upon receiving a tightening torque in excess of a predetermined value, will lock or detent into a locked position that inhibits loosening of the chuck. This automatic locking feature provides for a quick and easy way of locking the work piece in the chuck. This automatic locking feature, however, may open during use in certain situations, such as abrupt stall, high vibration, and when the sleeve rubs on an object while working in a tight space. Thus, while this type of automatic locking feature provides for a quick and easy way of securing a work piece in a chuck, it only provides moderate performance and may be susceptible to opening during use.

A second type of locking feature that can be utilized is a manual locking feature. With this type of locking feature, a user is required to tighten the chuck onto the work piece and then manually lock the chuck sleeve via axial movement of the sleeve, or a connected component, with respect to the body. This type of locking chuck provides excellent performance in that the locking sleeve is prevented from loosening during operation by being rotationally fixed relative to the body. The use of the manually locking feature, however, adds an extra step to the use of the tool incorporating the chuck. Thus, while greater performance can be achieved, the use of such a chuck is more time consuming.

Thus, the current keyless locking chucks require a choice between utilizing one that incorporates an automatic lock or one that incorporates a manual locking feature. Accordingly, when selecting a chuck, a tradeoff must be made between choosing one that is quicker to operate, but provides a less secure locking feature and may loosen during use, and choosing one that provides superior locking performance, but requires an additional step to achieve this benefit.

SUMMARY OF THE INVENTION

The inventors of the present invention have developed a new and novel approach to address the tradeoffs required in prior art keyless chucks. The inventors have developed a new keyless chuck that incorporates both an automatic locking feature and a manual locking feature. The chuck can be operated with just the automatic locking feature during situations when the quick securing of a work piece to the chuck is desirable and the additional protection of the manual locking feature is not necessary. When the additional protection provided by the manual locking feature is needed and the extra step associated with performing the manual locking feature is desired, the chuck can also be manually locked in place. Thus, the keyless chuck of the present invention provides the benefits of both an automatic locking feature and a manual locking feature without requiring a tradeoff between the two types of locking features. Furthermore, the present chuck allows for utilizing strictly the automatic locking feature or utilizing the automatic locking feature in conjunction with the manual locking feature.

A chuck according to the principles of the present invention includes moveable jaws operable to selectively retain a work piece. There is an actuating member operable to cause the jaws to move when the actuating member rotates relative to the jaws. Movement of the jaws corresponds to tightening and loosening of the jaws. A first locking feature is operable to selectively prevent the actuating member from rotating relative to the jaws. The second locking feature is operable to inhibit the actuating member from rotating relative to the jaws. The second locking feature inhibits loosening of the jaws after a tightening force exceeding a predetermined value has been imparted between the actuating member and a component of the second locking feature.

In another aspect of the present invention, a method of securing a work piece in a chuck is disclosed. The method includes: (1) positioning the work piece between jaws of the chuck; (2) rotating an actuating member relative to the jaws to tighten the jaws to the work piece; (3) automatically inhibiting loosening rotation of the actuating member with a first locking member after a tightening force exceeding a predetermined value is imparted between the actuating member and the first locking member; and (4) rotationally locking the actuating member relative to the jaws with a second locking member.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
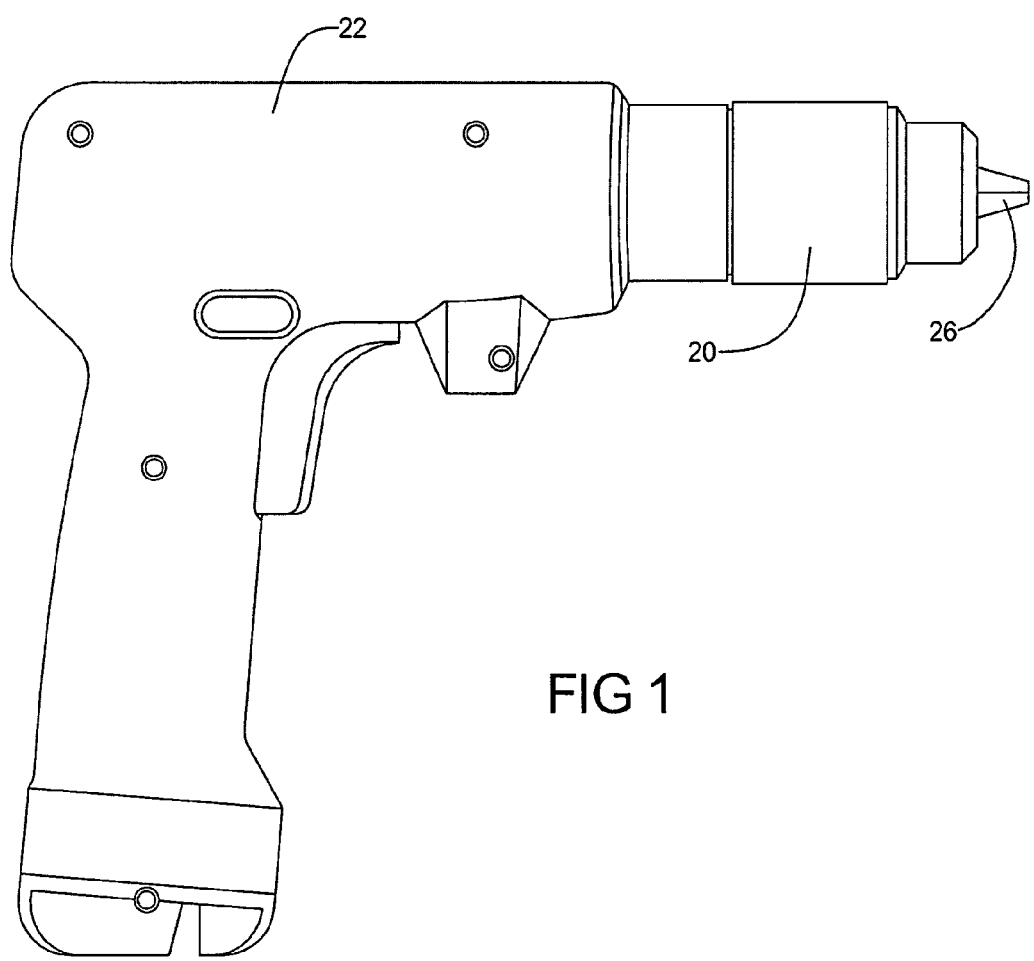
FIG. 1 is a side elevation view of a keyless chuck according to the principles of the present invention utilized on a power tool.
Figure 2:
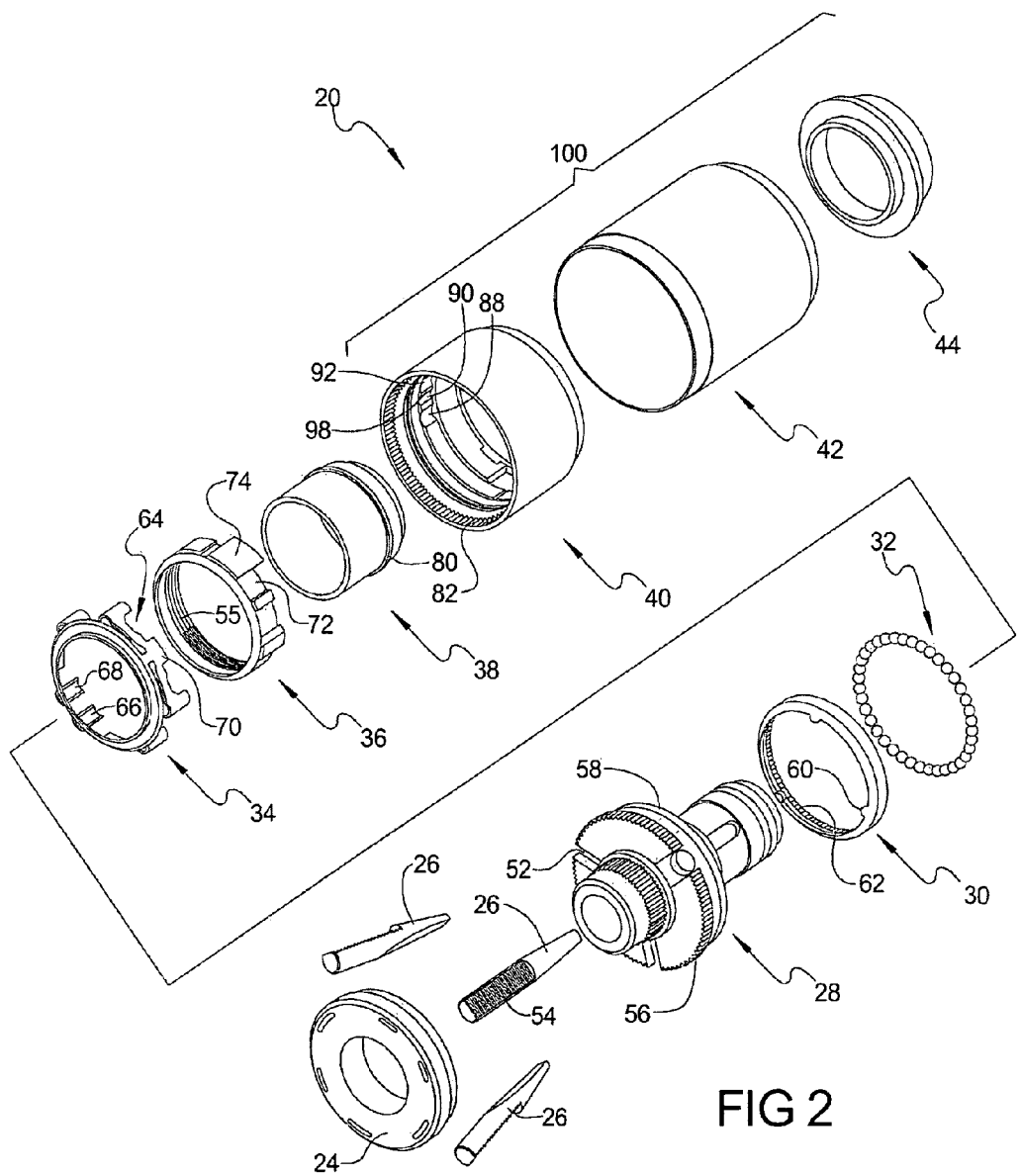
FIG. 2 is an exploded perspective view of the components of the chuck of FIG. 1.

Referring to FIG. 1, a keyless chuck 20, according to the principles of the present invention, is shown attached to a power tool 22, such as a drill or a like. An exploded view of chuck 20 is shown in FIG. 2. Chuck 20 includes an end cap 24, three jaws 26, a body 28, a retaining cup 30, loose ball bearings 32, an automatic locking and ratcheting mechanism 34, a nut 36, an inner nose 38, an inner sleeve 40, an outer sleeve 42, and an outer nose 44. These components of chuck 20 are assembled together and enable chuck 20 to selectively retain a work piece and to impart a desired movement thereto via operation of power tool 22.

Figure 3A:
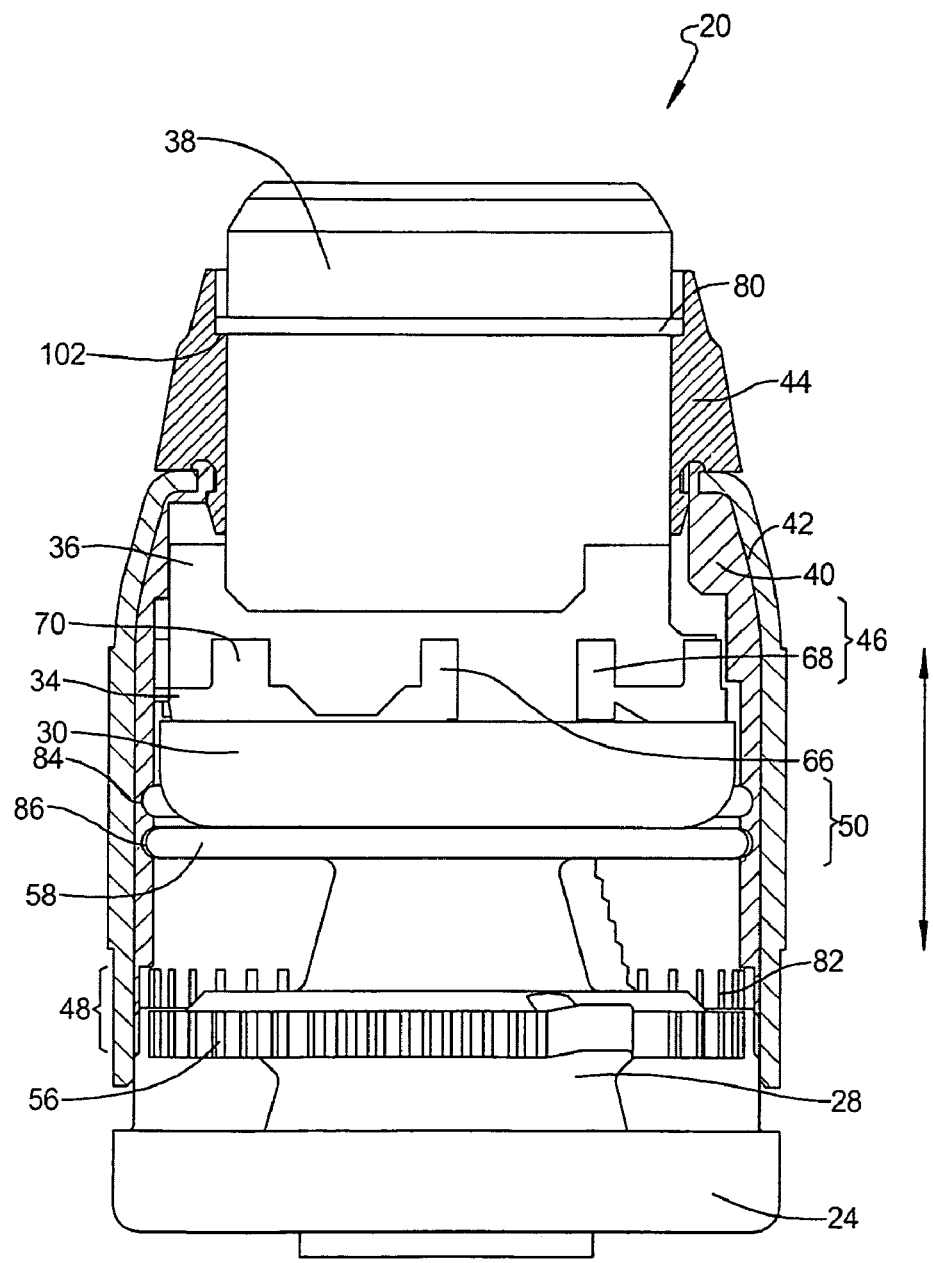
FIGS. 3A and B show a partial cross-sectional view of the chuck of FIG. 1 with the automatic locking feature engaged and a manual locking feature respectively disengaged and engaged.
Figure 6A:
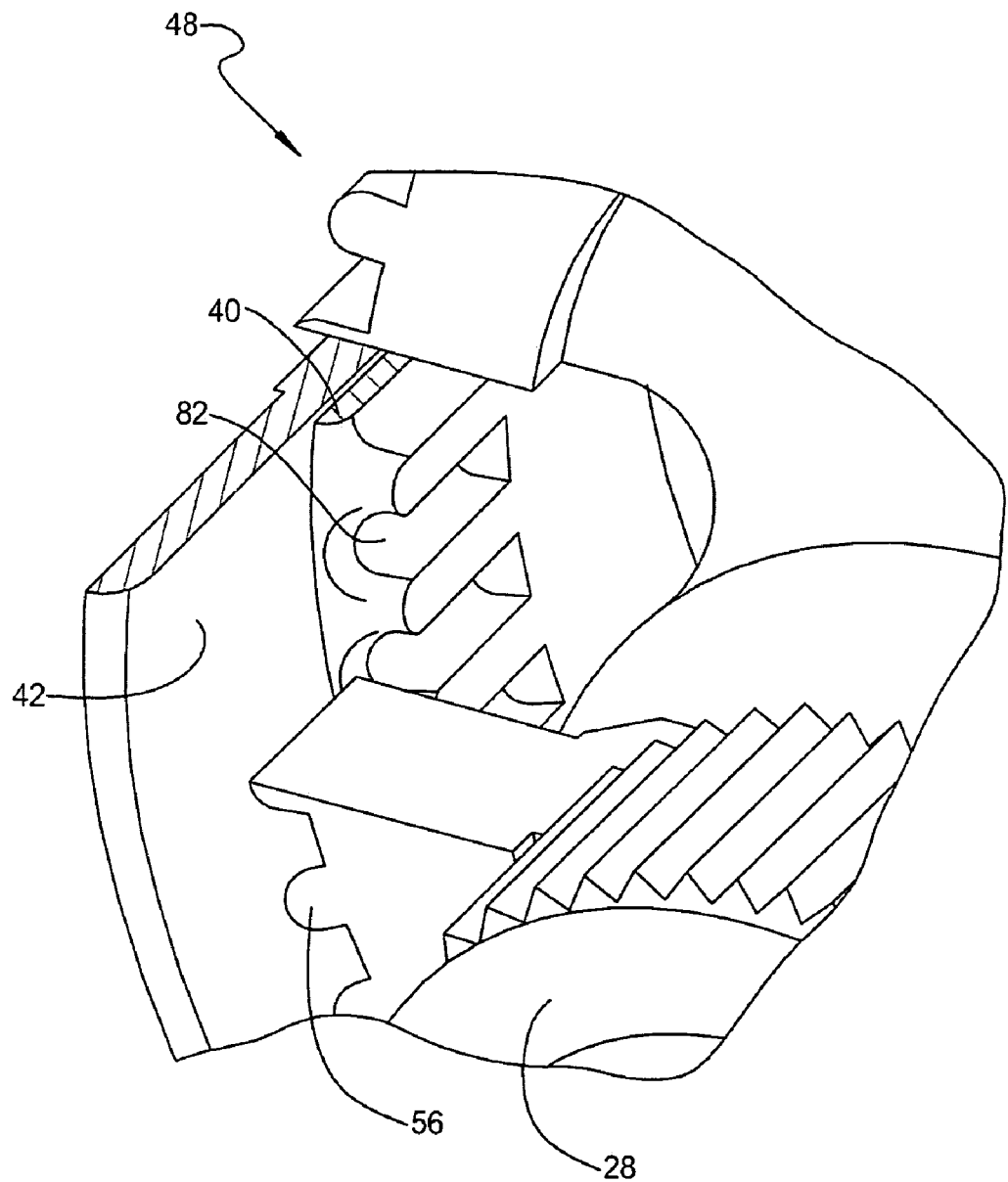
FIGS. 6A and B are fragmented partial sectional views of a portion of the chuck of FIG. 1 showing a portion of the manual locking feature in a respective disengaged and engaged position.

Referring now to FIGS. 3A and B, chuck 20 includes an automatic locking feature generally indicated as 46. Automatic locking feature 46 operates to lock chuck 20 in a tightened position and inhibits a loosening of chuck 20. Automatic locking feature 46 includes engagement between the automatic locking and ratcheting mechanism 34 (hereinafter referred to as ratcheting mechanism) and inner sleeve 40, as described in more detail below. Chuck 20 also includes a manual locking feature, generally indicated as 48. Manual locking feature 48 is operable to rotationally lock inner sleeve 40 to body 28 such that relative rotation therebetween is prevented. Manual locking feature 48 allows selective engagement between inner sleeve 40 and body 28, as shown in FIGS. 6A and B, by axially moving inner sleeve 40 relative to body 28, as described in more detail below. Chuck 20 also includes a retaining feature generally indicated as 50. Retaining feature 50 inhibits axial movement of inner sleeve 40 relative to body 28 and works in conjunction with manual locking feature 48, as described in more detail below.

Jaws 26 are disposed around body 28 in guides 52. Each jaw 26 has outer threads 54 that engage with internal threads 55 on nut 36. Jaws 26 move axially along a centerline axis (not shown) of guides 52 relative to body 28 as nut 36 rotates relative to body 28. Jaws 26 are preferably made of metal, such as steel.

Body 28 has three sets of teeth 56 extending radially outwardly. Teeth 56 are spaced apart along the outer surface of body 28. Teeth 56 form a portion of manual locking feature 48 and can be engaged with complementary teeth on inner sleeve 40 to rotationally fix inner sleeve 40 and body 28 together such that relative rotation therebetween is prevented, as described in more detail below. Body 28 also includes a radially extending annular projection 58 that engages with complementary annular recesses in inner sleeve 40 to inhibit axial movement of inner sleeve 40 relative to body 28, thereby preventing or minimizing the accidental unlocking of manual locking feature 48, as described in more detail below. The engagement between annular protection 58 and the complementary recesses on inner sleeve 40 form retaining feature 50. Body 28 is preferably made of metal, such as steel.

Referring now to FIGS. 2 and 4, retaining cup 30 is disposed around body 28. Radially inwardly extending projections or tabs 60 on cup 30 engage with complementary recesses on body 28 to rotationally fix cup 30 to body 28 such that relative rotation therebetween is prohibited. Cup 30 includes a track or race for bearings 32 to reside in and roll around during loosening and tightening of chuck 20. Cup 30 also includes a plurality of ratcheting steps or teeth 62 that engage with ratcheting mechanism 34 to provide an audible indication of the tightening of chuck 20, as described in more detail below. Cup 30 is preferably made of steel.

Referring to FIGS. 2, 3, and 4, ratcheting mechanism 34 is disposed around body 28. Ratcheting mechanism 34 is capable of rotation relative to body 28. Ratcheting mechanism 34 includes a track or race that faces the track on cup 30 and engages with bearings 32 disposed therebetween. Bearings 32 facilitate relative rotation between ratcheting mechanism 34 and body 28. Ratcheting mechanism 34 has three sets of arms, generally indicated as 64, that extend axially and radially outwardly and are spaced apart along ratcheting mechanism 34. As shown in FIGS. 3 and 4, each set of arms 64 includes a ratcheting arm 66 and a locking arm 68. Each ratcheting arm 66 engages with a recess and inner sleeve 40 and with ratcheting steps 62 in cup 30 to provide an audible clicking as chuck 20 is being tightened, as described below. Each locking arm 68 engages with a pair of recesses in inner sleeve 40 to allow inner sleeve 40 to rotate ratcheting mechanism 34 to tighten and loosen chuck 20. Locking arm 68 functions to automatically lock chuck 20 in a tightened state once a torque applied by inner sleeve 40 to ratcheting mechanism 34 exceeds a predetermined value, as discussed below. Ratcheting mechanism 34 is preferably made of metal, such as stamped spring steel.

Referring now to FIGS. 2, 3, and 5, ratcheting mechanism 34 includes axially extending projections or tabs 70 that engage with recesses 72 on nut 36 to rotationally fix ratcheting mechanism 34 to nut 36 such that relative rotation therebetween is not possible.

Referring now to FIGS. 2 and 5, nut 36 is disposed on body 28 with threads 55 engaged with threads 54 on jaws 26. Nut 36 is capable of rotation relative to body 28 and jaws 26. Nut 36 includes axially extending projections or tabs 74 that engage with recesses 76 in the inner surface of inner sleeve 40. Tabs 74 are narrower than recesses 76 and allow for a limited range of relative rotation between nut 36 and inner sleeve 40. This limited relative rotation allows for locking arm 68 to lock and unlock chuck 20 in the tightened state, as described in more detail below. Rotation of nut 36 relative to body 28 causes jaws 26 to move in and out of chuck 20 to grip and release a work piece, as is known in the art. Nut 36 is preferably made of metal, such as powered metal.

Referring now to FIGS. 2 and 3, inner nose 38 is pressed onto body 28 and is rotationally and axially fixed thereto. Jaws 26 extend out of and retract into inner nose 38 when tightening and loosening chuck 20. Inner nose 38 axially secures cup 30, ratcheting mechanism 34, and nut 36 relative to body 28. Inner nose 38 includes a radially outwardly extending annular projection 80 that, as shown in FIGS. 3A and B, limits forward axial movement of outer nose 44. Inner nose 30 is preferably made of metal, such as steel.

Referring now to FIGS. 2-6, inner sleeve 40 is disposed around body 28 and is axially moveable between an unlocked position (FIGS. 3A, 4A, 5A, and 6A) and a locked position (FIGS. 3B, 4B, 5B, and 6B) relative to body 28. When in the unlocked position, inner sleeve 40 can rotate relative to body 28. When in the locked position, inner sleeve 40 is rotationally fixed to body 28, and relative rotation therebetween is prevented. The inner surface of inner sleeve 40 includes a plurality of radially inwardly extending teeth 82 that can be selectively engaged with teeth 56 on body 28, via axial movement of inner sleeve 40 relative to body 28, to rotationally lock inner sleeve 40 to body 28 such that relative rotation therebetween is prevented. Engagement of teeth 82 with teeth 56 corresponds to the locked position of inner sleeve 40. Teeth 82 on inner sleeve 40 and teeth 56 on body 28 form manual locking feature 48. Inner sleeve 40 is preferably made of a polymer, such as a glass-filled nylon. Preferably, the nylon contains at least 30% glass by weight.

Figure 3B:
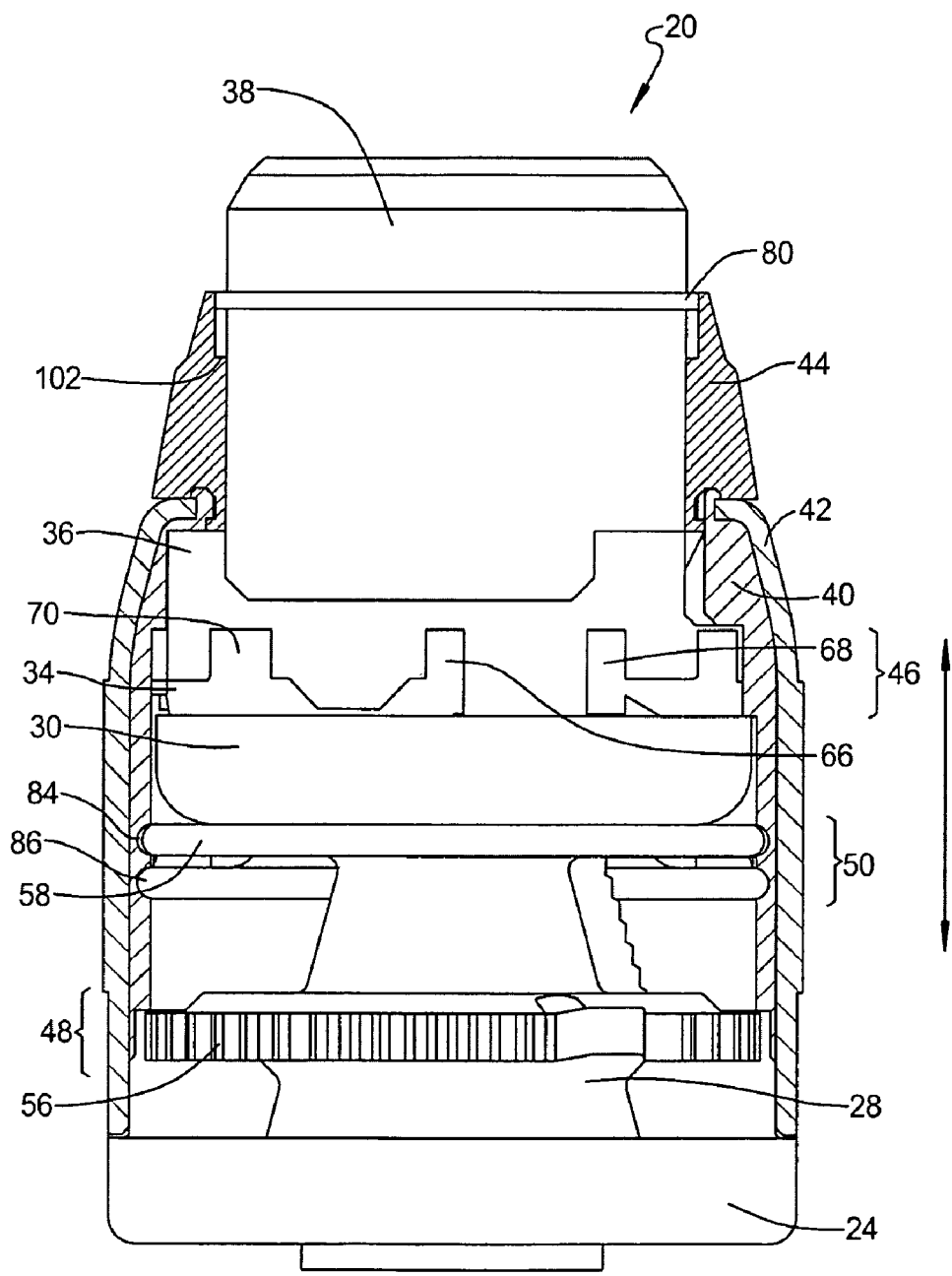

As best seen in FIGS. 3A and B, the inner surface of inner sleeve 40 includes a front and rear annular recess 84, 86. Recesses 84, 86 engage with annular projection 58 on body 28 to inhibit axial movement of inner sleeve 40 relative to body 28. Inhibiting the relative axial movement prevents or minimizes accidental locking and unlocking of manual locking feature 48. The inhibition is overcome by application of an axial force sufficient to overcome the engagement between projection 58 and recesses 84, 86. Front and rear recesses 84, 86 on inner sleeve 40 and annular projection 58 on body 28 form retaining feature 50. When in the unlocked position, as shown in FIG. 3A, projection 58 is disposed within rear recess 86. When in the locked position, as shown in FIG. 3B, projection 58 is disposed in front recess 84. The use of annular projection 58 is advantageous in that it provides a 360 degree engagement with recesses 84, 86 which provides a superior retaining feature and a more even distribution of the loads imparted between projection 58 and front recesses 84, 86 when moving into and out of engagement.

Figure 4A:
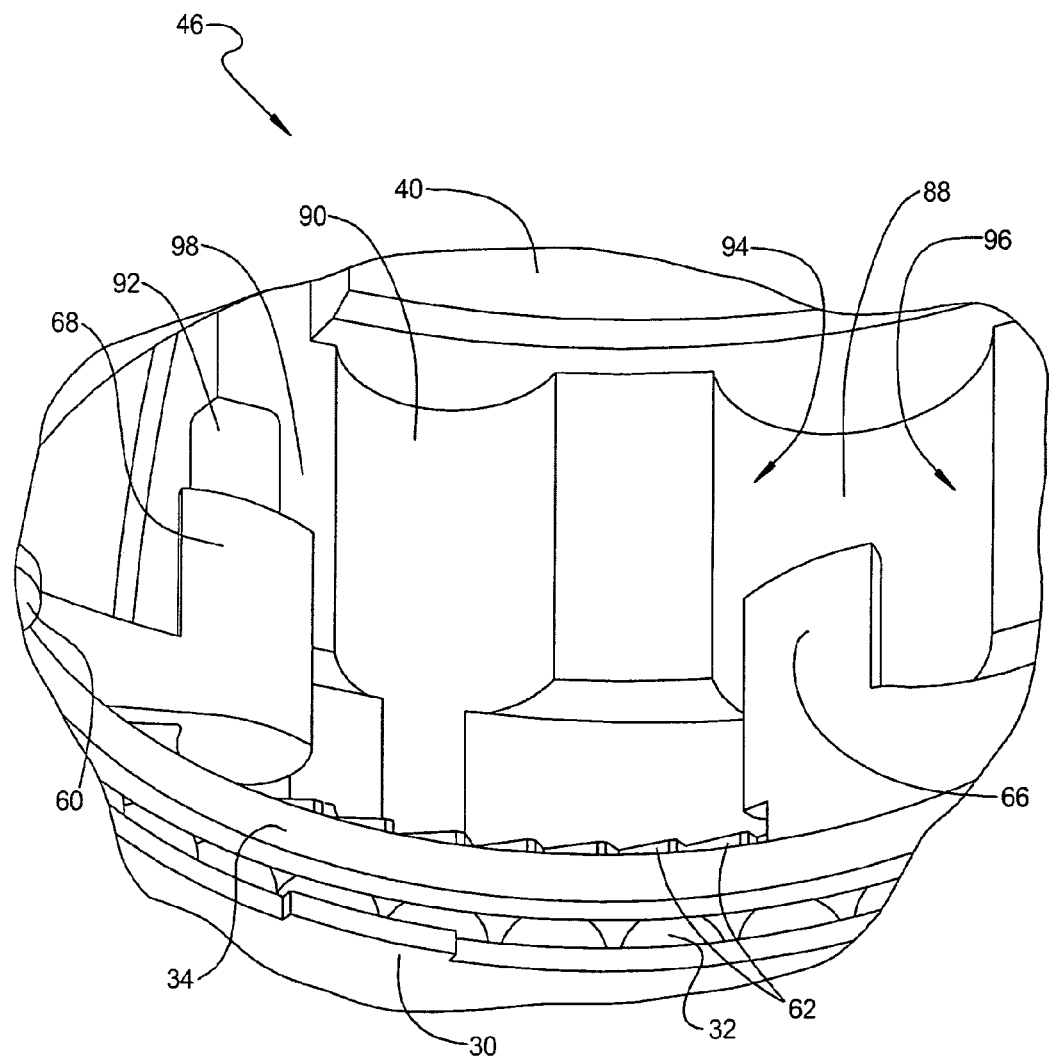
FIGS. 4A and B are fragmented partial sectional views of a portion of the chuck of FIG. 1 showing the engagement between the ratcheting mechanism and the inner sleeve with the automatic locking feature engaged and the manual locking feature respectively disengaged and engaged.

Referring now to FIGS. 4A and B, inner sleeve 40 includes 3 sets of axially extending recesses that engage with three sets of arms 64 of ratcheting mechanism 34. Each set of recesses includes a ratchet recess 88, a loosening/opening recess 90, and a tightening or closing recess 92. Ratchet recess 88 includes a tightening/closing ramp 94 and a loosening/opening ramp 96. Ratchet arm 66 will ride along tightening ramp 94 when inner sleeve 40 is being rotated to tighten chuck 20 and will ride along loosening ramp 96 when inner sleeve 40 is being rotated to loosen chuck 20. The shape or slope of loosening ramp 96 causes ratcheting arm 66 to move radially inwardly and disengage from ratchet steps 62 such that no audible clicking will be heard during the loosening of chuck 20.

A jump or projection 98 is disposed between loosening and tightening recesses 90, 92. Locking arm 68 will ride within loosening recess 90 and press against jump 98, while inner sleeve 40 is being rotated to tighten chuck 20. This interaction causes ratchet mechanism 34 to drive rotation of nut 36 to tighten jaws 26 and chuck 20. When the torque between inner sleeve 40 and locking arm 68 exceeds a predetermined value (as determined by such things as the height and slope of jump 98, the friction between jump 98 and locking arm 68, and the spring rate of locking arm 68), locking arm 68 will jump over jump 98 and into tightening recess 92. The movement of locking arm 68 into tightening recess 92 causes a single loud audible click or noise indicating that chuck 20 is now fully tightened. The jumping of locking arm 68 over jump 98 results in a limited relative rotation between inner sleeve 40 and nut 36. When inner sleeve 40 is subsequently rotated to loosen chuck 20, locking arm 68 will jump back over jump 98 and into loosening recess 90 and drive rotation of ratcheting mechanism 34, which in turn drives rotation of nut 36 to loosen jaws 26 and chuck 20.

Figure 5A:
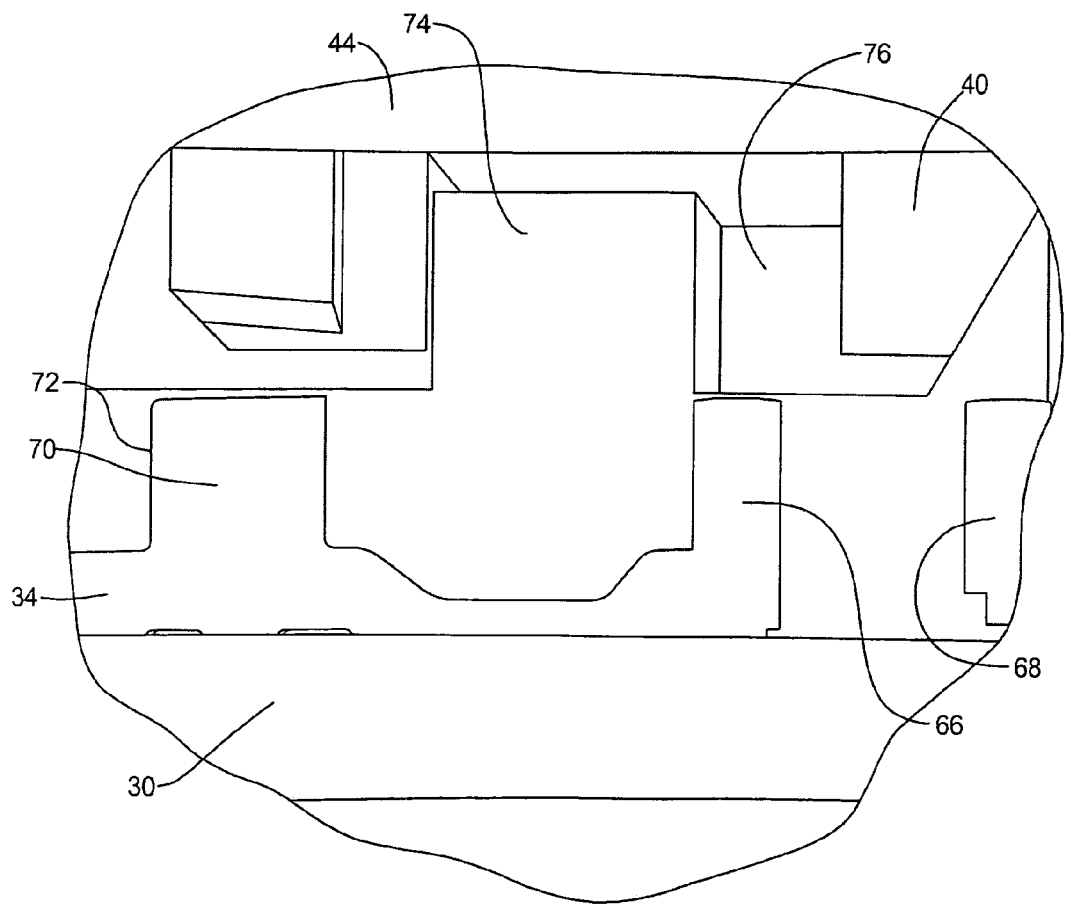
FIGS. 5A and B are fragmented partial sectional views of a portion of the chuck of FIG. 1 showing the engagement between the nut, the inner sleeve, and the ratcheting mechanism with the automatic locking feature engaged and the manual locking feature respectively disengaged and engaged.
Figure 5B:
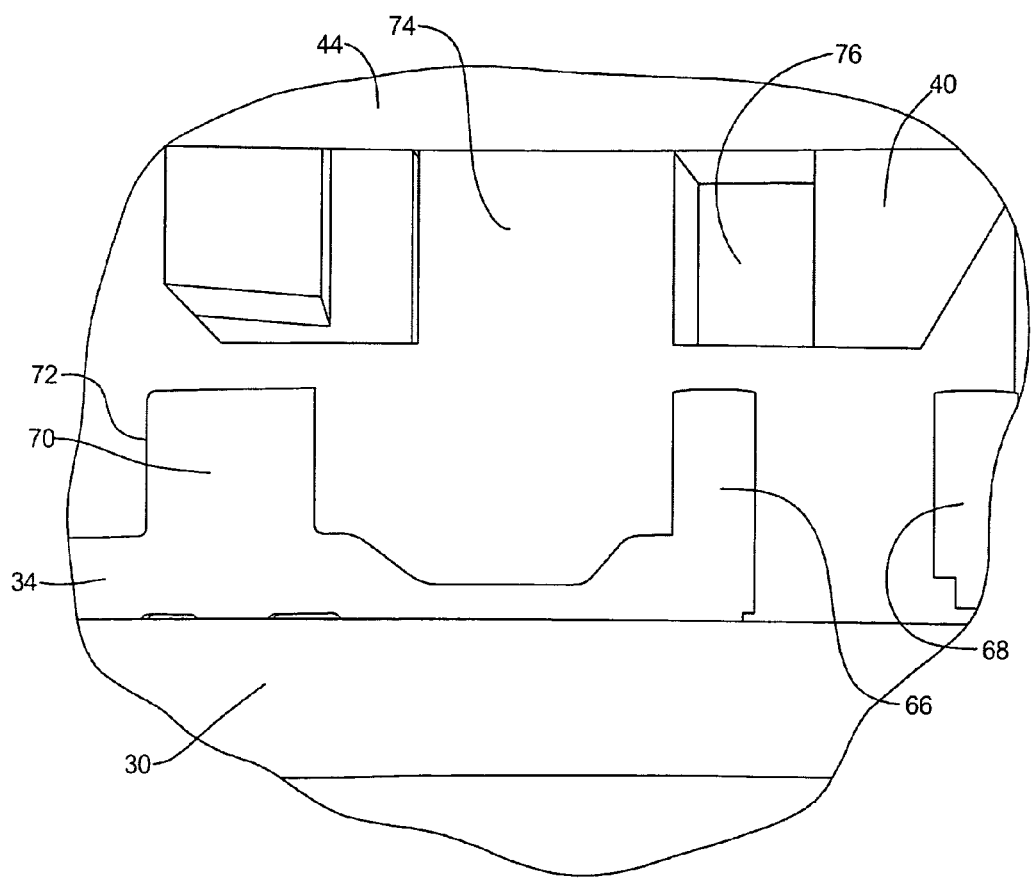

Referring now to FIGS. 5A and B, axially extending recess 76 in inner sleeve 40 is shown with tabs 74 of nut 36 disposed therein. Recess 76 is wider than tab 34 to allow for limited relative rotation therebetween and accommodates movement of locking arm 68 between loosening and tightening recesses 90, 92 along with movement of ratcheting arm 66 between tightening ramp 94 and loosening ramp 96.

Loosening and tightening recesses 90, 92, locking arm 68, and their engagement form automatic locking feature 46. The jumping of locking arm 68 from loosening recess 90 into tightening recess 92 is the automatic lock of chuck 20 and locks chuck 20 in the tightened state.

Referring now to FIGS. 2 and 3, outer sleeve 42 is disposed on inner sleeve 40 and is fixed axially and rotationally relative thereto. Rotation of outer sleeve 42 drives rotation of inner sleeve 40, and axial movement of outer sleeve 42 drives axial movement of inner sleeve 40. Outer sleeve 42 is preferably made of metal, such as steel.

Still referring to FIGS. 2 and 3, outer nose 44 snaps onto inner sleeve 40 and retains outer sleeve 42 on inner sleeve 40. Outer nose 44 is fixed rotationally and axially to inner sleeve 40 and outer sleeve 42. As such, rotation of outer sleeve 42 causes rotation of outer nose 44 and axial movement of outer sleeve 42 causes axial movement of outer nose 44. The fixed relation between inner sleeve 40, outer sleeve 42, and outer nose 44 forms a sleeve assembly, generally indicated as 100, with all of these components moving in unison with one another. Outer nose 44 includes an internal annular shoulder 102 that engages with projection 80 on inner nose 38 to limit forward axial movement of sleeve assembly 100. Outer nose 44 is preferably made of metal, such as steel.

In operation, the loosening of chuck 20 is performed by rotating sleeve assembly 100 relative to body 28. Sleeve assembly 100 can be rotated relative to body 28 when manual locking feature 48 is in the unlocked state, as shown in FIGS. 3A and 6A. The unlocked state for manual locking feature 48 corresponds to sleeve assembly 100 being axially moved to its forwardmost position. When in this position, teeth 82 in inner sleeve 40 are forward of and not engaged with teeth 56 on body 28. With manual locking feature 48 disengaged, sleeve assembly 100 is capable of rotation relative to body 28 to cause chuck 20 to loosen or tighten, depending upon the direction of rotation of sleeve assembly 100. Furthermore, with manual locking feature 48 in the unlocked position, annular projection 58 is engaged in rear recess 86 of inner sleeve 40.

Figure 4B:
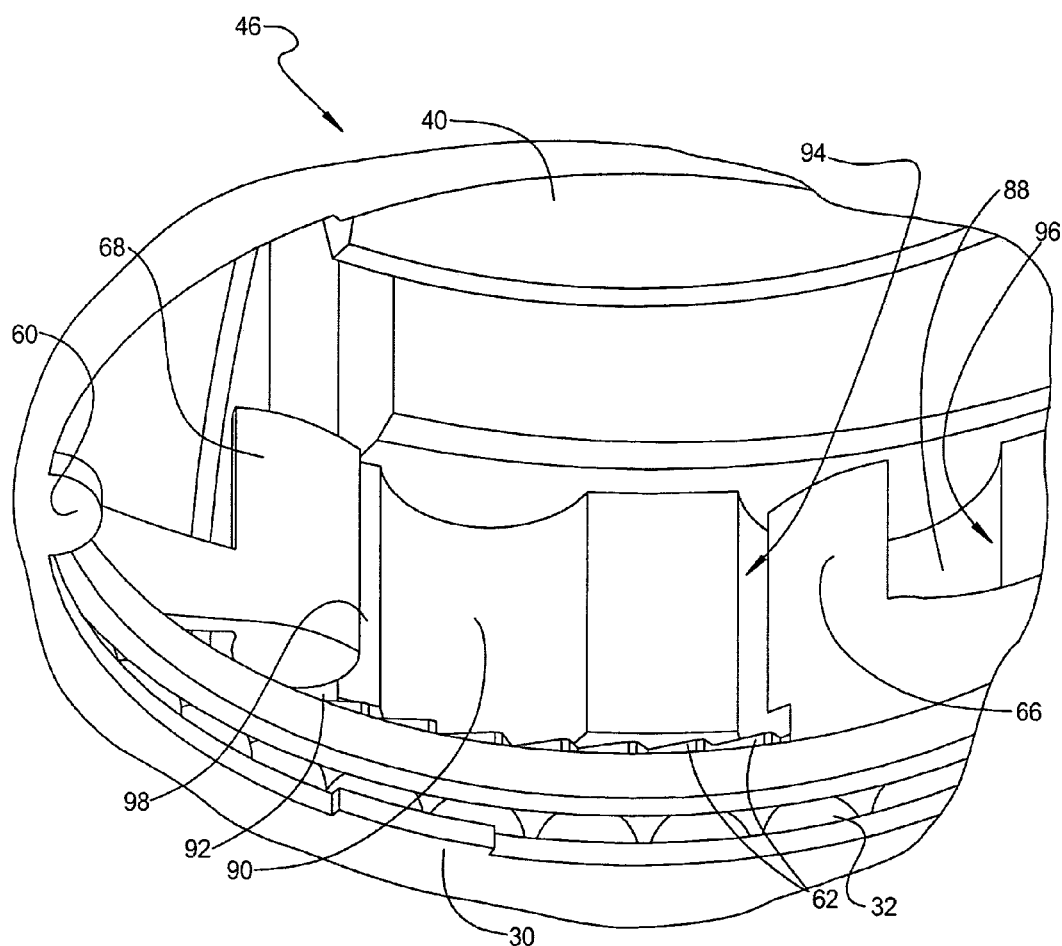

When chuck 20 is in its loosest state, ratchet arm 66 is disposed within ratchet recess 88 between tightening ramp 94 and loosening ramp 96. Locking arm 68 is disposed within loosening recess 90. As shown in FIGS. 4A and B, the axial depth of ratchet recess 88, loosening recess 90, and tightening recess 92 accommodates the axial movement of sleeve assembly 100 relative to ratcheting mechanism 34 while maintaining an engagement between ratcheting and locking arms 66, 68 and recesses 88, 90, 92 of inner sleeve 40. This is evidenced by the gap between the ends of the projections on arms 66, 68 and the forward end walls of recesses 88, 90, 92 and inner sleeve 40, as shown in FIG. 4A. When sleeve assembly 100 is moved to its rearmost position, as shown in FIG. 4B, the gap between the forward end walls of recesses 88, 90, 92 and the ends of the projections on arms 66, 68 is diminished.

Accordingly, chuck 20 allows for axial movement of inner sleeve 40 and sleeve assembly 100 relative to ratcheting mechanism 34. Additionally, recesses 76 are also dimensioned to allow for relative axial movement between inner sleeve 40 and nut 36 while maintaining tabs 74 within recesses 76, as shown in FIGS. 5A and B. Furthermore, when chuck 20 is in a loose state, tabs 74 of nut 36 may be disposed at any location within recesses 76 and are not necessarily engaged with the sidewalls of recesses 76, thus allowing for some limited relative rotation between inner sleeve 40 and nut 36.

To tighten chuck 20, sleeve assembly 100 is rotated. The rotation of sleeve assembly 100 is imparted to ratcheting mechanism 34 via the engagement between locking arm 68 and jump 98 and inner sleeve 40. As inner sleeve 40 is rotated, locking arm 68 approaches jump 98. Jump 98 prevents locking arm 68 from jumping into tightening recess 92 until the torque therebetween exceeds a predetermined value. Thus, jump 98 pushes on locking arm 68 to cause rotation of ratcheting mechanism 34 relative to body 28. As ratcheting mechanism 34 rotates, tabs 70 impart rotational movement to nut 36. As nut 36 rotates relative to body 28, jaws 26 extend out of chuck 20 and tighten about a work piece disposed within jaws 26. Additionally, ratcheting arm 66 is disposed on tightening ramp 94. With ratcheting arm 66 engaged with tightening ramp 94, ratcheting arm 66 will also be engaged with ratchet steps 62. Thus, as ratchet mechanism 34 rotates relative to the body 28 and cup 30, the engagement between ratcheting arm 66 and ratchet step 62 will provide a substantially continues audible clicking as the relative rotation occurs.

Once jaws 26 come into engagement with the work piece or with one another, continued rotation of sleeve assembly 100 causes the torque between inner sleeve 40 and ratcheting mechanism 34 to increase. Once the torque exceeds the predetermined value, locking arm 68 will jump over jump 98 and into tightening recess 92 and provide a single loud audible click to indicate that chuck 20 is now fully tightened. Furthermore, as locking arm 68 jumps into tightening recess 92, ratcheting arm 66 will move further along tightening ramp 94. Additionally, relative rotation between inner sleeve 40 and nut 36 occurs as locking arm 68 jumps from loosening recess 90 to tightening recess 92 and results in tabs 74 of nut 36 moving to a position adjacent the sidewall of recess 76 of inner sleeve 40. This engagement between tabs 74 and recess 76 rotationally locks inner sleeve 40 to nut 36 such that no more relative rotation in the tightening direction is possible.

Figure 6B:
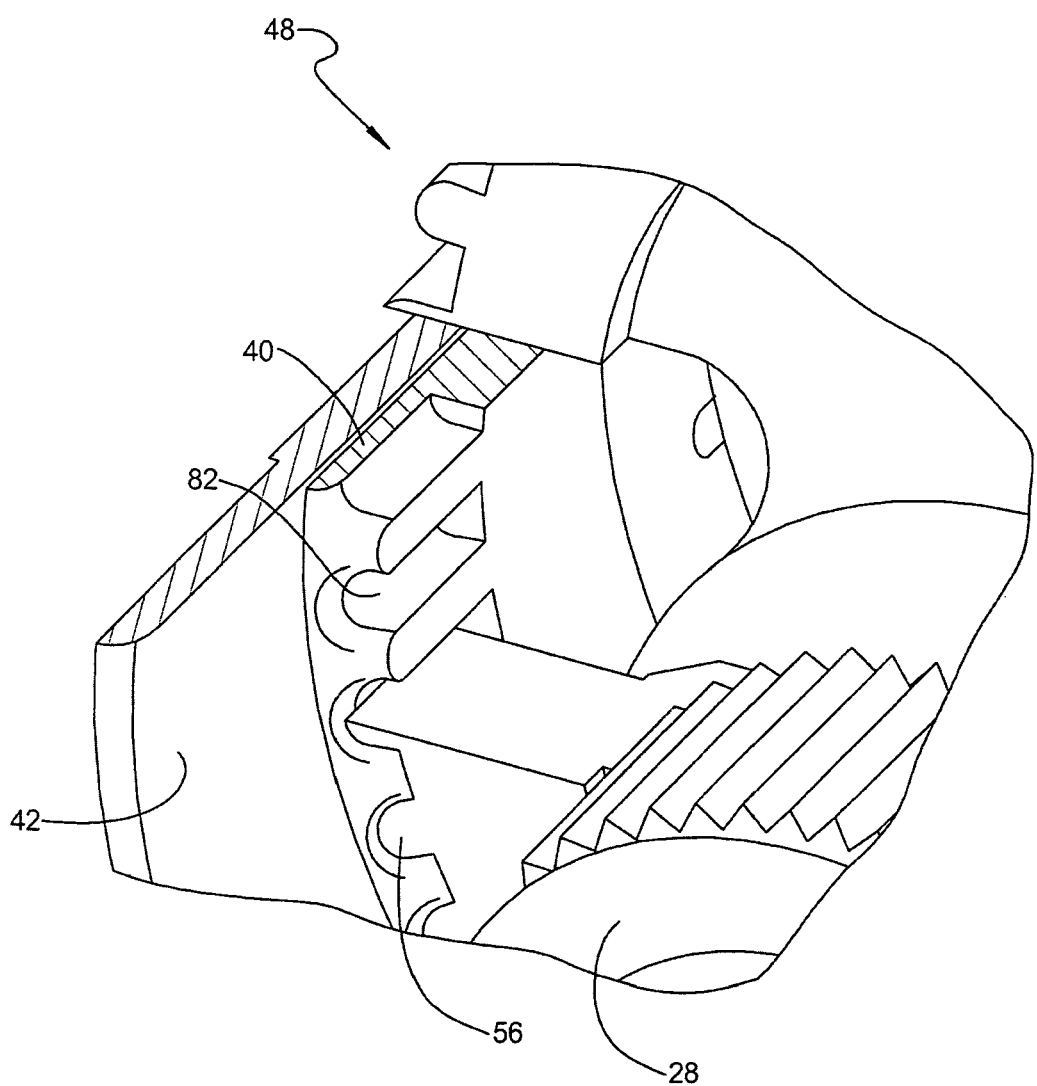

With locking arm 68 residing within tightening recess 92, automatic locking feature 46 is thereby engaged, and chuck 20 and the work piece therein can be used as desired. If additional security against chuck 20 loosening during operation is desired, manual locking feature 48 can be engaged by moving sleeve assembly 100 axially rearwardly. Retaining feature 50 will resist this movement such that engagement of manual locking feature 48 cannot be accidentally engaged or disengaged. To engage manual locking feature 48, sleeve assembly 100 is moved axially rearwardly and projection 58 exits rear recess 86 and enters front recess 84, as shown in FIG. 3B. Simultaneously, teeth 82 on inner sleeve 40 move into engagement with teeth 56 on body 28, as shown in FIGS. 3B and 6B. Engagement between teeth 82 and teeth 56 rotationally secures inner sleeve 40 to body 28 such that rotational movement therebetween is prevented. With automatic locking feature 46 engaged and manual locking feature 48 engaged, chuck 20 is prevented from loosening during operation, thus providing a superior holding ability. Accordingly, chuck 20 can be operated with either only the automatic locking feature 46 engaged or with both automatic locking feature 46 and manual locking feature 48 engaged.

To loosen chuck 20, manually locking feature 48, if engaged, is moved to a disengaged position by moving sleeve assembly 100 axially forward relative to body 28. This relative movement causes projection 58 to move from being engaged with front recess 84, as shown in FIG. 3B, to being engaged with rear recess 86, as shown in FIG. 3A. Simultaneously, teeth 82 of inner sleeve 40 disengage from teeth 56 on body 28, as shown in FIGS. 3A and 6A. With manual locking feature 48 disengaged, sleeve assembly 100 can then be rotated relative to body 28 to loosen chuck 20. Initial rotation of sleeve 100 to loosen chuck 20 is inhibited by automatic locking feature 46 and the engagement between locking arm 68 and jump 98. When a sufficient torque exists between jump 98 and locking arm 68, locking arm 68 will jump jump 98 and move into loosening recess 90, providing a single loud audible click or noise. Simultaneously, relative rotation between inner sleeve 40 and nut 36 will occur due to the difference in width between recesses 76 of inner sleeve 40 and tabs 34 of nut 36. As inner sleeve 40 is continued to be rotated relative to body 28 to loosen chuck 20, loosening recess 90 will push on locking arm 68 to drive rotation of ratcheting mechanism 34 and nut 36 relative to body 28 and cause ratcheting arm 66 to ride up onto loosening ramp 96. As ratcheting arm 66 rides up loosening ramp 96, ratcheting arm 66 moves radially inwardly and disengages from ratchet steps 62. This disengagement prevents ratchet steps 62 from inhibiting the loosening of chuck 20 and removes any audible noise from recurring as chuck 20 is loosened. Sleeve assembly 100 can then continue to be rotated until chuck 20 is in the desired loose state. If desired, chuck 20 can be manually locked while chuck 20 is in a loose state by axially moving sleeve assembly 100 rearwardly relative to body 28.

The proceeding description of the invention is merely exemplary in nature and, thus, variations that do not depart from the gist of the invention are intended to be within the scope of the invention. For example, the audible noises provided by engagement of ratcheting mechanism 34, inner sleeve 40, and/or cup 30 can be eliminated, if desired. Furthermore, the number of sets of arms 64 and sets of recesses 88, 90, 92 on the inner sleeve 40 can be more or less, as desired. Additionally, other materials of construction can be imparted for the various components. Moreover, it should be appreciated that manual locking feature 48 can be used without engaging automatic locking feature 46, if desired. For example, when a work piece having a hex-shaped shaft is used, the work piece can be tightened to less than the predetermined torque, thereby not activating automatic locking feature 46, and then engaging manual locking feature 48. Such a usage may be useful to provide quick changes between work pieces having hex shafts of similar size. It should also be appreciated that chuck 20 can be used on a manually operated tool. Moreover, it should be readily apparent to one skilled in the art that chuck 20 can be manipulated (tightened, loosened, and locked—both automatically and manually) through a single-handed operation because of automatic locking feature 46 and manual locking feature 48. Accordingly, such variations are not to be regarded as a departure from the spirit and scope of the invention.

What is claimed is:

1. A chuck comprising:
   moveable jaws operable to selectively retain a work piece;
   an actuating member operable to cause said jaws to move when said actuating member rotates relative to said jaws, movement of said jaws corresponding to tightening and loosening said jaws;
   a first locking feature operable to selectively prevent said actuating member from rotating relative to said jaws regardless of a non-breaking rotational force imparted on said actuating member, said first locking feature being separate from said jaws; and
   a second locking feature operable to inhibit said actuating member from rotating relative to said jaws, said second locking feature moving to an inhibiting position when a force exceeding a predetermined value has been imparted between said actuating member and a component of said second locking feature, said second locking feature inhibiting loosening of said jaws when in said inhibiting position.

2. The chuck of claim 1, wherein said force is a tightening force.

3. The chuck of claim 2, wherein said tightening force is a first force and wherein said second locking feature disengages when a second force exceeding a predetermined value is imparted between said actuating member and said component of said second locking feature.

4. The chuck of claim 3, wherein said second force is a loosening force.

5. The chuck of claim 1, further comprising:
a body around which said jaws are disposed, said body and said jaws being substantially rotationally fixed relative to one another; and
a nut disposed on said body and capable of rotation relative to said body, said nut being engaged with said jaws so that rotation of said nut relative to said jaws causes movement of said jaws.

6. The chuck of claim 5, wherein said actuating member is a sleeve directly engaged with said nut and said engagement between said sleeve and said nut allows a limited relative rotation therebetween.

7. The chuck of claim 6, wherein said sleeve can move axially relative to said nut and maintain said engagement between said actuating member and said nut.

8. The chuck of claim 1, wherein said second locking feature includes a locking member operable between said inhibiting position and a non-inhibiting position corresponding to said second locking feature not inhibiting said actuating member from rotating relative to said jaws, said locking member being engaged with a first feature on said actuating member when in said inhibiting position, said locking member being engaged with a second feature on said actuating member when in said non-inhibiting position, and said locking member moving from engagement with said second feature to engagement with said first feature when said force exceeding said predetermined value has been imparted between said actuating member and said locking member.

9. The chuck of claim 1, wherein said first locking feature is operable to prevent said actuating member from rotating relative to said jaws independent of a status of said second locking feature.

10. The chuck of claim 1, wherein said first locking feature is operable to prevent said actuating member from rotating relative to said jaws independent of a relative axial position between said actuating member and said jaws.

11. A power tool having the chuck of claim 1.

12. The power tool of claim 11, wherein the power tool is hand operated.

13. A chuck comprising:
moveable jaws operable to selectively retain a work piece;
a body around which said jaws are disposed, said body and said jaws being substantially rotationally fixed relative to one another;
a nut disposed on said body and capable of rotation relative to said body, said nut engaged with said jaws such that rotation of said nut relative to said jaws causes movement of said jaws;
an actuating member coupled to said nut and operable to cause said jaws to move when said actuating member rotates relative to said jaws, movement of said jaws corresponding to tightening and loosening said jaws;
a first locking feature comprising a first locking element associated with said actuating member and a second locking element associated with said body, said first locking feature operable to prevent said actuating member from rotating relative to said jaws when said first and second locking elements are engaged with one another, and said second locking element being an integral component of said body; and
a second locking feature comprising a first inhibiting element associated with said actuating member and a second inhibiting element associated with said nut, said second locking feature operable to inhibit said actuating member from rotating relative to said jaws, said second locking feature inhibiting loosening of said jaws until a force exceeding a predetermined value has been imparted between said first and second inhibiting elements.

14. The chuck of claim 13, wherein said first locking element is integral with said actuating member.

15. The chuck of claim 14, wherein said first locking element is a plurality of axially extending grooves in said actuating member.

16. The chuck of claim 13, wherein said second locking element is a plurality of axially extending grooves in said body.

17. The chuck of claim 13, wherein both of said first and second locking elements are integral components of said actuating member and said body, respectively.

18. The chuck of claim 13, wherein said actuating member is manually axially moveable between first and second positions, said first position corresponding to said first and second locking elements being disengaged and allowing rotation of said actuating member relative to said jaws, and said second position corresponding to said first and second locking elements being engaged and preventing rotation of said actuating member relative to said jaws.

19. The chuck of claim 13, wherein said first locking feature is operable to prevent said actuating member from rotating relative to said jaws independent of a status of said second locking feature.

20. The power tool of claim 19, wherein the power tool is hand operated.

21. A power tool having the chuck of claim 13.

22. A method of securing a work piece in a chuck that can be attached to a power tool, the method comprising:
(a) positioning the work piece between jaws of the chuck;
(b) rotating an actuating member relative to said jaws to tighten said jaws to the work piece;
(c) automatically inhibiting loosening rotation of said actuating member with a first locking member after a tightening force exceeding a predetermined value is imparted between said actuating member and said first locking member; and
(d) locking said actuating member relative to said jaws with a second locking member by axially moving a component of the chuck from a first unlocked position to a second locked position, said second locking member being one or more components of the chuck and operable to be engaged independent of a status of the chuck being attached to a power tool.

23. The method of claim 22, wherein (d) includes axially moving said actuating member from said first position allowing said actuating member to rotate relative to said jaws to said second position rotationally locking said actuating member relative to said jaws.

24. The method of claim 22, wherein movement of said jaws is driven by an engagement between said actuating member and said first locking member, (b) is performed with said first locking member engaged with a first engagement feature on said actuating member, and (c) includes moving said first locking member from engagement with said first engagement feature to engagement with a second engagement feature on said actuating member as said force exceeds said predetermined value.

25. A method of securing a work piece in a chuck, the method comprising:
   (a) positioning the work piece between jaws of the chuck;
   (b) rotating an actuating member relative to said jaws to tighten said jaws to the work piece;
   (c) engaging a first locking feature of the chuck that inhibits loosening rotation of said actuating member relative to said jaws; and
   (d) engaging a second locking feature of the chuck after engaging said first locking feature by axially moving a component of the chuck relative to the jaws from a first unlocked position to a second locked position, engaging said second locked feature preventing loosening rotation of said actuating member relative to said jaws while said component is in said second position.

26. The method of claim 25, wherein engaging said first locking feature includes applying a rotational tightening force exceeding a predetermined engaging value between said actuating member and a first locking member.

27. The method of claim 25, wherein said first locking feature is disengaged by applying a loosening rotational force that exceeds a predetermined disengaging value between said actuating member and said first locking member.

28. The method of claim 25, wherein engaging said second locking feature includes moving said actuating member axially relative to said jaws between said first and second positions.

29. The method of claim 25, wherein engaging said second locking feature includes engaging said component with teeth on a body of the chuck when in said second position.

30. The method of claim 25, wherein said second locking feature is operable to be engaged independent of a status of the chuck being attached to a power tool.

* * * * *

UNITED STATES PATENT AND TRADEMARK OFFICE
CERTIFICATE OF CORRECTION

| | | Page 1 of 1 |
|---|---|---|
| PATENT NO. | : 7,757,374 B2 | |
| APPLICATION NO. | : 12/054180 | |
| DATED | : July 20, 2010 | |
| INVENTOR(S) | : Thomas L. Luckenbaugh et al. | |

It is certified that error appears in the above-identified patent and that said Letters Patent is hereby corrected as shown below:

Title Page:

Item (45) Date of Patent, "Jul. 20, 2010" should be -- *Jul. 20, 2010 --.

Item (*) Notice, insert the following: -- This patent is subject to a terminal disclaimer. --.

Signed and Sealed this

Eleventh Day of January, 2011

David J. Kappos
*Director of the United States Patent and Trademark Office*